US012773790B2

United States Patent

(12) United States Patent
Fok et al.

(10) Patent No.: US 12,773,790 B2
(45) Date of Patent: Oct. 27, 2026

(54) PNEUMATIC SOFT ROBOTIC SPIRAL GRIPPER WITH FIBER OPTIC SENSOR

(71) Applicant: University of Georgia Research Foundation, Inc., Athens, GA (US)

(72) Inventors: Mable P. Fok, Bishop, GA (US); Mei Yang, Athens, GA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 995 days.

(21) Appl. No.: 17/909,548

(22) PCT Filed: Mar. 4, 2021

(86) PCT No.: PCT/US2021/020810
§ 371 (c)(1),
(2) Date: Sep. 6, 2022

(87) PCT Pub. No.: WO2021/178627
PCT Pub. Date: Sep. 10, 2021

(65) Prior Publication Data
US 2023/0122515 A1 Apr. 20, 2023

Related U.S. Application Data

(60) Provisional application No. 62/985,056, filed on Mar. 4, 2020.

(51) Int. Cl.
*B25J 15/00* (2006.01)
*B25J 9/00* (2006.01)
*B25J 19/02* (2006.01)

(52) U.S. Cl.
CPC ......... *B25J 15/0023* (2013.01); *B25J 9/0012* (2013.01); *B25J 19/025* (2013.01)

(58) Field of Classification Search
CPC ...... B25J 15/0023; B25J 15/12; B25J 9/0012; B25J 19/025; B65B 47/91; B65B 47/905; B65B 47/908
(Continued)

(56) References Cited

U.S. PATENT DOCUMENTS

| | | | | |
|---|---|---|---|---|
| 2,765,930 A * | 10/1956 | Greer | B25J 1/02 | 414/7 |
| 3,640,564 A * | 2/1972 | Kuster | B25B 11/00 | 294/200 |

(Continued)

OTHER PUBLICATIONS

International Search Report for PCT/US21/20810 mailed Jul. 27, 2021.

(Continued)

*Primary Examiner* — Paul T Chin
(74) *Attorney, Agent, or Firm* — Thomas | Horstemeyer, LLP

(57) ABSTRACT

Various examples are provided related to pneumatic soft robotic spiral grippers. A fiber optic sensor can enable spiral-gripper sensing of, e.g., a twining angle and target cylinder diameter. In one example, a pneumatic soft robotic spiral gripper includes an elastic spine with an embedded fiber optic sensor and a pneumatic spiral channel twining around the elastic spine. The pneumatic spiral channel can be formed in a soft gripping material surrounding the elastic spine. In another example, a method fabrication of a pneumatic soft robotic spiral gripper includes providing a gripper mold with an outer mold wall and a spiral shaped rod positioned within the outer mold wall. An elastic spine can be inserted through the spiral shaped rod and the gripper mold filled with gripping material that can be cured to form a soft gripping material surrounding the elastic spine.

16 Claims, 6 Drawing Sheets

(58) Field of Classification Search
USPC .......................................... 294/99.1, 208, 86.4
See application file for complete search history.

(56) References Cited

U.S. PATENT DOCUMENTS

| | | | | |
|---|---|---|---|---|
| 4,739,692 | A * | 4/1988 | Wassam | B25J 17/0275 92/92 |
| 4,792,173 | A | 12/1988 | Wilson | |
| 4,881,817 | A | 11/1989 | Kim et al. | |
| 5,019,121 | A * | 5/1991 | Krauter | A61B 1/008 92/92 |
| 5,067,390 | A * | 11/1991 | Negishi | F15B 15/103 92/92 |
| 5,080,000 | A * | 1/1992 | Bubic | B25J 18/06 92/92 |
| 5,727,391 | A * | 3/1998 | Hayward | F03G 7/0635 60/528 |
| 6,419,291 | B1 * | 7/2002 | Preta | A61B 17/22032 294/902 |
| 9,835,184 | B2 * | 12/2017 | Bishop-Moser | F15B 15/10 |
| 11,618,159 | B2 * | 4/2023 | Zhang | B25J 18/06 74/490.01 |
| 2015/0337874 | A1 | 11/2015 | Park et al. | |
| 2016/0287346 | A1 | 10/2016 | Hyodo et al. | |
| 2017/0056118 | A1 * | 3/2017 | Cooper | B25J 15/0023 |
| 2018/0017088 | A1 * | 1/2018 | Asai | B25J 15/12 |
| 2018/0207814 | A1 | 7/2018 | Lessing et al. | |
| 2018/0297214 | A1 | 10/2018 | Lessing et al. | |
| 2019/0126497 | A1 | 5/2019 | Onal et al. | |

OTHER PUBLICATIONS

Y. She, C. Li, J. Cleary, and H. J. Su, "Design and Fabrication of a Soft Robotic Hand With Embedded Actuators and Sensors," J Mech Robot 7, 021007 (2015).

B. Huang and X. Shu, "Ultra-compact strain- and temperature-insensitive torsion sensor based on a line-by-line inscribed phase-shifted FBG," Opt Express 24, 17670-17679 (2016).

H. M. Kim, T. H. Kim, B. Kim, and Y. Chung, "Temperature-Insensitive Torsion Sensor With Enhanced Sensitivity by Use of a Highly Birefringent Photonic Crystal Fiber," IEEE Photonics Technol. Lett. 22, 1539-1541 (2010).

B. Song, Y. Miao, W. Lin, H. Zhang, J. Wu, and B. Liu, "Multi-mode interferometer-based twist sensor with low temperature sensitivity employing square coreless fibers," Opt Express 21, 26806-26811 (2013).

O. Frazao, J. M. T. Baptista, and J. L. Santos, "Recent Advances in High-Birefringence Fiber Loop Mirror Sensors," Sensors 7, 2970-2983 (2007).

* cited by examiner

Table 1. Comparison of different material ratio under the 450° azimuthal angle model.

| Material | 1:1 | 1:2 | 1:3 | 1:4 |
|---|---|---|---|---|
| Hollow diameter (mm) | 0.8 | 0.9 | 1.0 | 1.3 |
| Tip displacement (mm) | 11.6 | 12.8 | 13.2 | 13.6 |
| Pressure limit (MPa) | 0.66 | 0.665 | 0.67 | 0.67 |
| Total twining angle (°) | 549.6 | 546.8 | 545.0 | 542.7 |

FIG. 3A
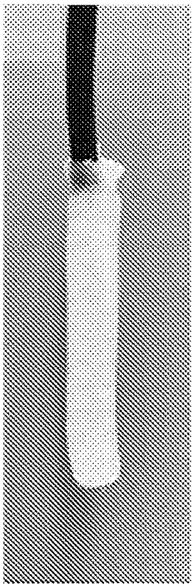
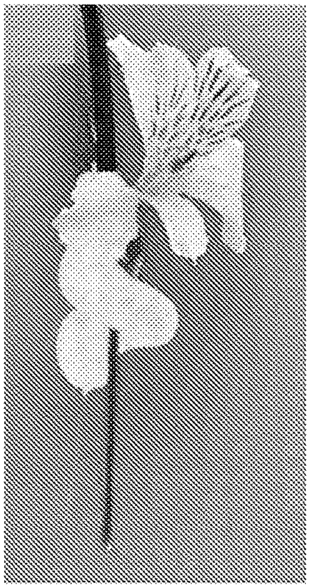
FIG. 3B
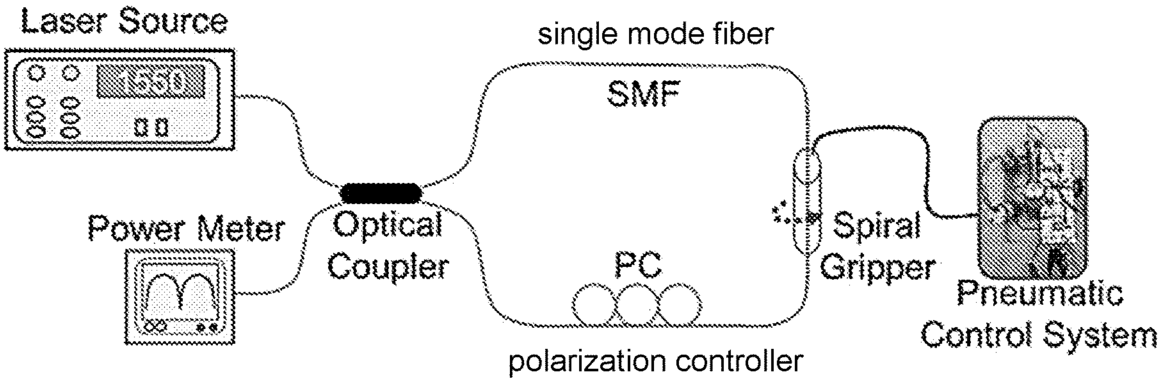
FIG. 3C

PNEUMATIC SOFT ROBOTIC SPIRAL GRIPPER WITH FIBER OPTIC SENSOR

CROSS REFERENCE TO RELATED APPLICATIONS

This application is the 35 U.S.C. § 371 national stage application of PCT Application No. PCT/US2021/020810, filed Mar. 4, 2021, which claims priority to, and the benefit of, U.S. Provisional Application No. 62/985,056, filed Mar. 4, 2020, both of which are hereby incorporated by reference herein in their entireties.

BACKGROUND

Robotics made from soft and elastic materials has been an emerging technology that offer unique opportunities where conventional rigid robots are not a viable solution. The soft, elastic, and deformable nature of the robotics allow it to mimic complex motions of human, animals, and plants. Pneumatic soft robotics is of particular interest because it is lightweight, inexpensive, and is safer around human and harsh environments. There are two major types of existing pneumatic soft robotic gripper—robotic hands and robotic tentacles. For example, research has examined the use of soft robotic grippers in healthcare treatment and automated industrial processes such as advanced assembly and food handling. However, both soft robotic gripper designs require a large operation space to allow the soft robotic gripper to gain access to the target object.

SUMMARY

Aspects of the present disclosure are related to pneumatic soft robotic spiral grippers. A fiber optic sensor can enable spiral-gripper sensing of, e.g., a twining angle and target cylinder diameter. In one aspect, among others, a pneumatic soft robotic spiral gripper comprises an elastic spine comprising an embedded fiber optic sensor; and a pneumatic spiral channel twining around the elastic spine, the pneumatic channel formed in a soft gripping material surrounding the elastic spine. The embedded fiber optic sensor can be a high-birefringence (HB) fiber optic sensor. The embedded fiber optic sensor can be centered in the elastic spine, extending along the axial length of the elastic spine.

In one or more aspects, the elastic spine can comprise a cured silicone surrounding the embedded fiber optic sensor. The cured silicone can have a shore hardness of about 10 A or higher. The soft gripping material can have a shore hardness that is ⅓ of the shore hardness of the cured silicone used in the elastic spine. In some aspects, the elastic spine can have a first diameter and the pneumatic spiral channel can have a second diameter less than or equal to the first diameter. The pneumatic soft robotic spiral gripper can twine in response to actuation of the pneumatic spiral channel with a gas or fluid. The gas can be air.

In various aspects, the pneumatic spiral channel can be formed with at least one complete spiral cycle around the elastic spine. The pneumatic spiral channel can be formed with an integer number of spiral cycles around the elastic spine or with a fractional number of spiral cycles around the elastic spine. The pneumatic soft robotic spiral gripper can comprise a plurality of pneumatic spiral channels twining around the elastic spine. The plurality of pneumatic spiral channels can be evenly distributed about the elastic spine. The plurality of pneumatic spiral channels can be formed with at least one complete spiral cycle around the elastic spine. The plurality of pneumatic spiral channels can be formed with an integer number or a fractional number of spiral cycles around the elastic spine.

In another aspect, a method for fabrication of a pneumatic soft robotic spiral gripper comprises providing a gripper mold comprising: an outer mold wall extending along a length of the gripper mold from a proximal end to a distal end; and a spiral shaped rod positioned within the outer mold wall, the spiral shape rod extending from the proximal end of the gripper mold to adjacent to the distal end of the gripper mold, where a length of the spiral shaped rod is less than the length of the gripper mold; inserting an elastic spine through the spiral shaped rod, the elastic spine extending from adjacent to the proximal end of the gripper mold to adjacent to the distal end of the gripper mold; filling the gripper mold with a gripping material that surrounds the elastic spine and spiral shaped rod; curing the gripping material in the gripper mold to form a soft gripping material surrounding the elastic spine; and removing the soft gripping material and elastic spine from the gripper mold, the soft gripping material comprising a pneumatic spiral channel surrounding the elastic spine, the pneumatic spiral channel formed by the spiral shaped rod. In one or more aspects, the elastic spine can comprise an embedded fiber optic sensor. The gripper mold can be a three-dimensional printed mold. The pneumatic spiral channel can be formed by the spiral shaped rod with at least one complete spiral cycle around the elastic spine. In various aspects, the gripper mold can comprise a plurality of spiral shaped rod positioned within the outer mold wall, through which the elastic spine can be inserted. The pneumatic spiral channel(s) can be formed with an integer number or a fractional number of spiral cycles around the elastic spine.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A and 3B are images of the pneumatic soft robotic spiral gripper of FIGS. 2A and 2B before and after actuation, in accordance with various embodiments of the present disclosure.

FIG. 3C illustrates the experimental setup for the embedded fiber optic sensor in the pneumatic soft robotic spiral gripper of FIGS. 2A and 2B, in accordance with various embodiments of the present disclosure.

DETAILED DESCRIPTION

Figure 2C:
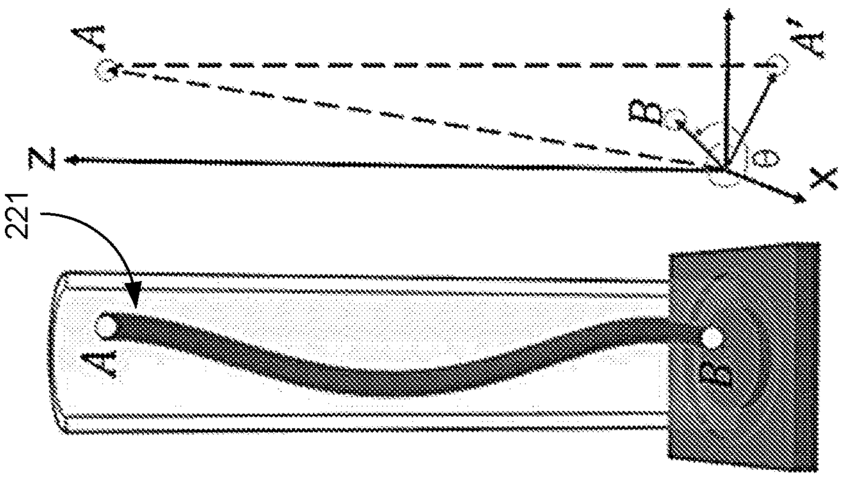
FIG. 2C illustrates an example of a 3D printed mold for fabricating the pneumatic soft robotic spiral gripper of FIGS. 2A and 2B, in accordance with various embodiments of the present disclosure.

Disclosed herein are various examples related to pneumatic soft robotic spiral grippers including a fiber optic sensor. For example, the pneumatic soft-robotic spiral gripper can be embedded with a high-birefringence fiber-optic sensor. The fiber-optic sensor can enable the spiral-gripper to sense a twining angle and target cylinder diameter as small as 1 mm. The pneumatic soft robotic spiral grippers can be powered by air or other appropriate gas. Fluids, such as water, ion fluid, and ferrofluid can also be used to power the soft robotic spiral gripper. The choice of gas or fluid heavily dependent on the application and surrounding environment. Reference will now be made in detail to the description of the embodiments as illustrated in the drawings, wherein like reference numbers indicate like parts throughout the several views.

Figure 1:
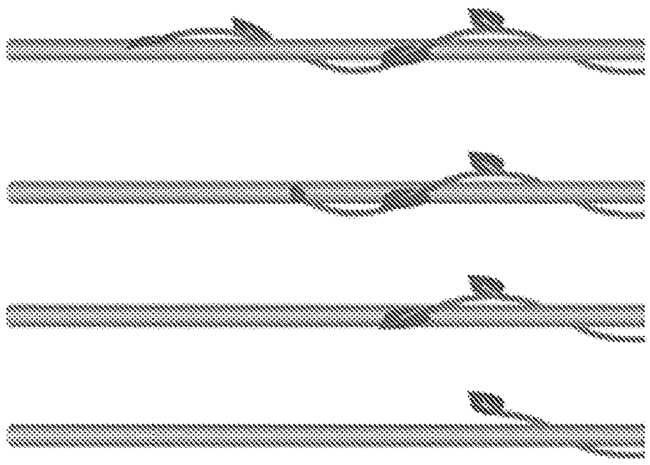
FIG. 1 illustrates the wrapping motion in a twining plant, in accordance with various embodiments of the present disclosure.

Nature offers an effective solution to overcome the need for a large operation space to allow the soft robotic gripper to gain access to the target object. The twining plant can securely grip onto a small target in a confined operation space. In this disclosure, a design for a high-birefringence fiber optic sensor embedded pneumatic soft robotic spiral gripper that is inspired by the wrapping motion of a twining plant, as illustrated in FIG. 1, is discussed and experimentally demonstrated. The uniqueness of twining plants shown in FIG. 1 is that, during its spiral movement around the target, the plant establishes discrete points of contact which create anchorage points to securely hold onto the target. A directional growth movement (thigmotropism) governs how the plant twins onto the target. The growth rate on the side of the stem in contact with the target is slower than the opposite side that is not being touched, making the stem spiral on the target as it grows. If the growing tendrils are regarded as a fixed-length soft robot, the climbing process turns into a twining motion through twisting.

Although soft robots with sophisticated movements can be achieved, the development of sensors embedded in soft robots is still lacking. Sensors are an important component to provide accurate pneumatic control, to acquire information on the target object, and to detect unusual external disturbance. Glass fiber optic sensors offer a lightweight, small size, low loss, multiplexing, and fast response solution that has been deployed in various fields including biomedical, civil engineering, and aerospace engineering. The downside of glass fiber optic sensors that hinders its application in soft robotics is the lack of elasticity of glass fiber. While polymer fiber offers a solution to stretchability, it may not inherit all the unique advantages from glass fiber optic sensors. Furthermore, due to the Young's Modulus difference between polymer fiber and the soft robot's silicone material, the polymer fiber can experience delamination when directly embedded in the soft robot without a careful embedding design. It has been shown that it is possible to embed glass fiber optic sensors in soft robots through unique embedding architecture and mechanical design.

In the design of the pneumatic soft robotic spiral gripper, a single spiral air channel for pneumatic powering can be used to mimic the directional growth movement of a twining plant, such that the soft robotic spiral gripper can wrap around the target spirally. The elastic spine 206 of the spiral gripper uses harder material to mimic the slower growing rate of the one side of stem in twining plant. This configuration eliminates the need of multiple pneumatic controls and minimize the operation space needed to hold onto an object. Embedding an optical sensor such as, e.g., a high-birefringence (HB) fiber optic sensor in the soft robotic gripper enables the twining angle to be sensed, as well as identifying the target property and external perturbation. For example, the twining angle can be sensed for a target cylinder diameter as small as 1 mm. The low cost and simplicity of the high birefringence fiber based twisting sensor when compared with other fiber optic-based twist sensors makes it advantageous for its use in the spiral soft robot.

Principle and Modeling

Figure 2A:
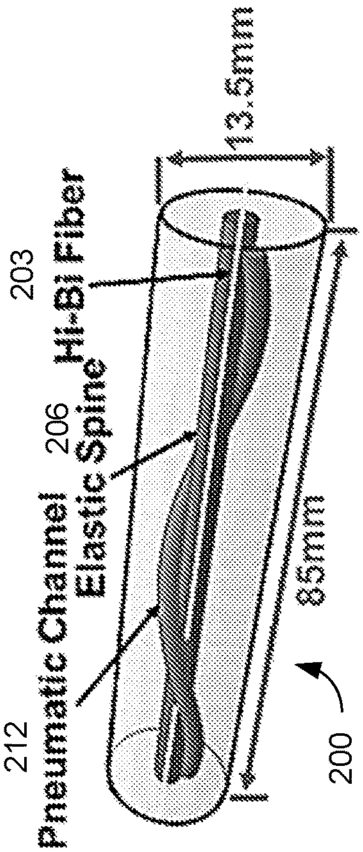
FIGS. 2A and 2B illustrate an example of a pneumatic soft robotic spiral gripper with an embedded fiber optic sensor, in accordance with various embodiments of the present disclosure.
Figure 2B:
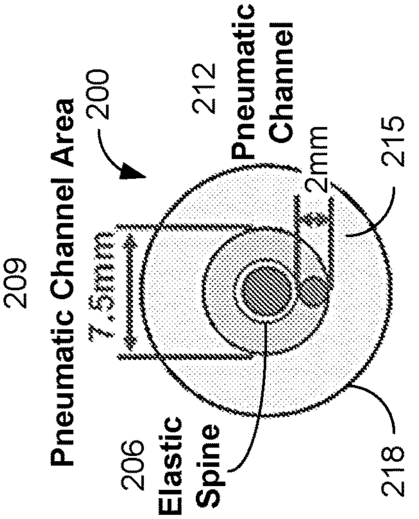

FIGS. 2A and 2B are three-dimensional (3D) perspective and cross-sectional views of example of a pneumatic soft robotic spiral gripper 200 with an embedded fiber optic sensor. FIG. 2A illustrates a design with a high-birefringence (HB) fiber optic sensor 203 embedded within the pneumatic soft robotic spiral gripper 200, however other types of fiber optics sensors can be utilized in this configuration. The soft robotic spiral gripper 200 comprises an elastic spine 206 within a pneumatic (e.g., air) channel area 209. The HB fiber optic sensor 203 can be embedded in and extends through the length of the elastic spine 206. A pneumatic channel 212 (e.g., an air channel) is twined around the length of the elastic spine 206 in the air channel area 209. The elastic spine 206 with the HB fiber optic sensor 203, and the pneumatic channel 212 are encased within a soft, flexible and elastic material 215 (e.g., silicone rubber) to form the soft robotic spiral gripper 200. As shown in FIG. 2A, a cylindrical elastic body made of the elastic material 215 hosts the helical pneumatic channel 212 to enable the twining motion. One or more layer(s) of contact material(s) 218 can be applied over the whole or part of the soft, flexible and elastic material 215 to adjust contact characteristics of the soft robotic spiral gripper 200. While the disclosure describes the soft robotic spiral gripper 200 with a single pneumatic channel 212, soft robotic spiral grippers can also be fabricated with a plurality of pneumatic channels distributed about the elastic spine 206.

In the example shown in FIGS. 2A and 2B, the soft robotic spiral gripper 200 is about 85 mm in length, about 13.5 mm in diameter, and is made of silicone materials or siloxane-based polymers with various elasticity and hardness. The elastic spine 206 (e.g., about 3 mm in diameter) is located at the center of the soft robotic spiral gripper 200 and extends along its length. A spiral pneumatic channel 212 (e.g., about 2 mm in diameter) twines around the elastic spine 206 within the pneumatic channel area 209 (e.g., with a diameter of about 7.5 mm) for pneumatic control. In the example of FIGS. 2A and 2B, the HB fiber optic sensor 203 has a birefringence of $6.33\times10^{-4}$ and a length of about 90 mm. The HB fiber optic sensor 203 can be embedded at the center of the elastic spine 206 and can extend through its length.

The soft robotic spiral gripper 200 can be fabricated with the use of 3D printed molds, as the one shown in FIG. 2C. Two half cylindrical walls (e.g., 13.5-mm in diameter and 85-mm in height) can be used as the mold for the soft spiral gripper body for easy demolding. The base can include a circular groove for fixing the two half cylindrical walls in position. The 3D printed molds can be reused for reproducing the soft robotic spiral gripper 200. While the mold illustrates a circular cross-section, other geometric or patterned cross-sections (e.g., hexagonal, octagonal, etc.) can also be used.

A spiral (or helical) shape rod 221 with inner and outer spiral diameters (e.g., 3 mm and 7.5 mm) can be used as a pneumatic channel mold to create the pneumatic (air) channel 212 in the soft robotic spiral gripper 200 when the mold is filled with the soft, flexible and elastic material 215. As shown in FIG. 2C, the spiral (or helical) shape rod 221 extends from a proximal end of the mold but does not extend completely to the distal end of the mold. This configuration can seal the distal end of the pneumatic channel 212 for pressurization by air or other appropriate gas or fluid. The number of spiral cycles of the pneumatic channel 212 can affect the twisting motion of the soft robotic spiral gripper 200 during operation. For example, 1.5 spiral cycles in the air channel formed using the mold of FIG. 2C will result in twining motion of about 540° in the soft robotic spiral gripper 200. The mold including the spiral shape rod 221 can be 3D printed as a single integral unit.

A spiral (or helical) shape rod 221 can be attached to the base for creating the helical pneumatic channel 212. The spiral (or helical) shape rod 221 provides a mold for the helical pneumatic channel, that can be characterized by the azimuthal angle, θ. The azimuthal angle (θ) is defined as the direction change (i.e. angle between two vectors) between the orthogonal projection (point A' in FIG. 2C) of the top or distal end of the spiral (or helical) shape rod 221 (point A) on x-y plane and the vector connecting the origin and the bottom end of the spiral (or helical) shape rod 221 (point B). The azimuthal angle is the total direction change of helical pneumatic channel before actuation, which can be larger than 360° in FIG. 2C. A pneumatic channel with a smaller diameter results in a larger twining angle with the same body length.

Several 3D printers were tested, and it was found that the MakerBot Replicator 5 is capable of printing a uniform helical mold with the diameter as small as 2 mm and 80 mm in height without breaking. As the tests also showed, a pneumatic channel wall (i.e., the distance between the pneumatic channel 212 and the outside of the gripper body 200) of 3 mm not only allowed a larger twining angle under the same pressure but also prevented the gripper from bursting during actuation. By considering the 3D printer capability, a spiral gripper model that has a 2-mm pneumatic channel diameter, 85-mm body length, 80-mm pneumatic channel height, and 3-mm pneumatic channel wall thickness was used in both the simulation and experiment. Design parameters that can be optimized through simulation and experiment to achieve a secure grip include the azimuthal angle of the pneumatic channel, Young's modulus of the elastic spine 206, and the soft gripper body, as well as pneumatic pressure.

Model Optimization. Finite element analyses (FEA) in parametric studies were performed for model design optimization on Abaqus CAE with the Standard/Explicit model. For the analyses, the soft spiral gripper body included a 1:1 mixture of Ecoflex 00-10 and 00-30 that has Young's modulus of 0.0262 MPa. The Mooney-Rivlin nonlinear hyperelastic model was used with incompressibility constraints being considered, as it has been shown to be the most precise model for the Ecoflex silicone material used in the soft robotic spiral gripper 200. The first-order Mooney-Rivlin model has N=1, C10=0.0418 MPa, and C01=0.0106 MPa.

First, two preliminary experiments were performed to investigate the maximum actuation pressure the soft robotic spiral gripper 200 can support without breakage and the optimal number of twining cycles to achieve a secure grip. It was observed that the breakage point of the soft robotic spiral gripper 200 is around 0.675 MPa. Therefore, the actuation pressure in the simulation was set to be 0.67 MPa (97 psi). To study the optimal number of twining cycles, several twining models were experimentally tested. It was found that 1.5-cycles was the optimized number of cycles for securely gripping onto the target object. This was because soft robotic spiral grippers with less than 1.5 cycles had a loose grip, while grippers with close to 2 cycles made twining around the target object at the gripper tip difficult.

Figure 2D:
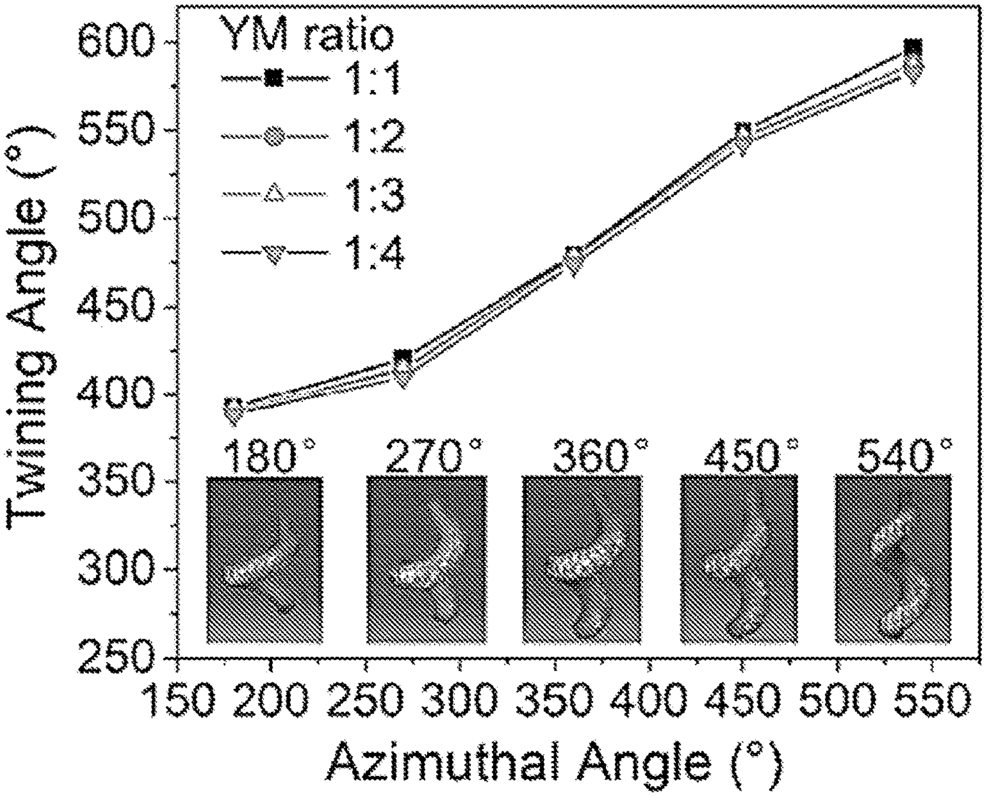
FIGS. 2D-2G illustrate examples of simulation characteristics of the pneumatic soft robotic spiral gripper of FIGS. 2A and 2B, in accordance with various embodiments of the present disclosure.

Next, the relationship between the azimuthal angle of the helical pneumatic channel and the maximum twining angle of the soft robotic spiral gripper 200 when actuated at 0.67 MPa (i.e. the maximum pressure before breakage occurs) was studied. The twining angle is defined as the direction change between the top and bottom of the soft robotic spiral gripper 200 after actuation. FIG. 2D illustrates an example of the relationship between azimuthal angle of the helical pneumatic channel and maximum twining angle of the soft robotic spiral gripper 200 with Young's modulus (YM) ratio between the gripper body and the elastic spine 206 of 1:1, 1:2, 1:3, and 1:4. The insets at the bottom of FIG. 2D show the corresponding simulation results of the actuated soft robotic spiral gripper 200 with the azimuthal angle of 180°, 270°, 360°, 450°, and 540°. The twining angle increases linearly with the increase in azimuthal angle of the helical pneumatic channel. It shows that azimuthal angle of 450° provides a twining angle of 540°, corresponding to 1.5 cycles of a full twining around a target object (e.g., the optimal number of cycles for a firm grip of the target object). Therefore, the helical pneumatic channel with 450° azimuthal angle was used to achieve a 540° twining of the soft spiral gripper under 0.67 MPa in the final design.

The effect on the twining angle due to the difference in Young's modulus ratio between the elastic material 215 of the soft gripper body and the elastic spine 206 is also studied by setting the ratio to be 1:1, 1:2, 1:3, and 1:4. The Mooney-Rivlin model parameter of material hardness used for simulation are matched to the Young's modulus ratio. For the same azimuthal angle in FIG. 2D, the variation in Young's modulus ratio between the soft gripper body and the elastic spine 206 has less than 2.6% or 14° change in the total twining angle of the soft robotic spiral gripper 200, which is negligible in the twining angle design. Furthermore, as observed in the preliminary experiment, the Young's modulus ratio between the soft gripper body and the elastic spine 206 has a significant effect on the minimum target object diameter that the spiral gripper can hold. When the soft robotic spiral gripper 200 is actuated, there is a hollow area at the center along the z-axis (twining axis) where the target object is going to be located.

Figure 2E:
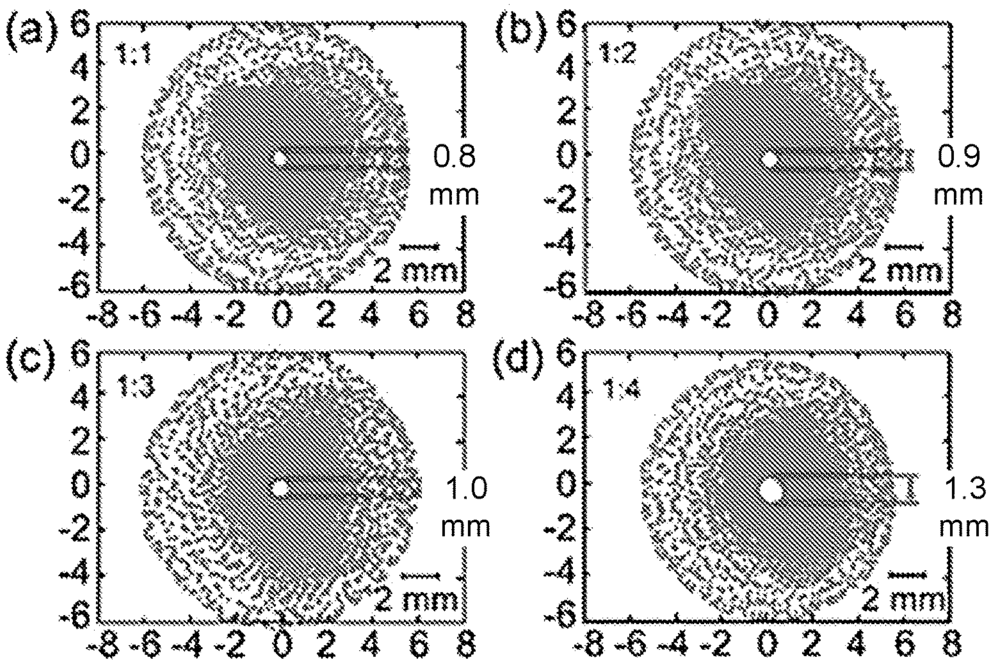

FIG. 2E illustrates how the hollow area diameter of the actuated soft robotic spiral gripper 200 changes at different Young's modulus ratios of (a) 1:1, (b) 1:2, (c) 1:3, and (d) 1:4. In the simulation, all the nodes along the z-axis are projected onto the x-y plane to observe the center hollow area, as shown in FIG. 2E. An azimuthal angle of 450° and pneumatic actuation pressure of 0.67 MPa were used in the simulation. It was observed that the nodes were distributed denser around the hollow region while they were sparer in the peripheral area due to the larger expansion in the outer region during the inflation of the pneumatic channel. As shown in FIG. 2E, the hollow region was measured to be 0.8 mm, 0.9 mm, 1.0 mm, and 1.3 mm in diameter for the Young's modulus ratios of 1:1, 1:2, and 1:3, and 1:4, respectively. A harder elastic spine (larger Young's modulus) resulted in a larger hollow center region because a harder material makes it more difficult to bend around a circle with a smaller diameter. The hollow area determines the smallest object that the soft spiral gripper could securely hold when actuated.

Although a softer elastic spine seems to provide the smaller gripping diameter, the elongation of the soft spiral gripper cannot be ignored. For example, Dragon Skin-10 has Young's modulus of 0.085 MPa and is able to be stretched by 663%, while Ecoflex 00-30 with Young's modulus around 0.027 MPa is able to be stretched by 900%. As the soft robotic spiral gripper 200 is actuated, its spiral motion results in elongation of the elastic spine 206 and a contraction of the overall gripper due to the displacement of the gripper tip. Large elongation of the elastic spine 206 potentially results in delamination of the fiber optic sensor 203 and leads to unreliable sensing performance. To prevent delamination of the fiber optic sensor 203 from the elastic spine 206, large displacement of the tip (large contraction of the soft robotic spiral gripper 200) is needed to minimize the elongation of the elastic spine 206. The displacement of the spiral gripper tip was measured and is summarized in the table of FIG. 2F. It is observed that a higher Young's modulus ratio results in a greater tip displacement and a smaller elongation. It is worth mentioning that although a Young's modulus ratio of 1:4 gives the greatest tip displacement, the elastic spine 206 is vulnerable to detachment from the spiral gripper body in the actuation process due to the large difference in Young's modulus. Therefore, taking the above criteria into consideration, a Young's modulus ratio of 1:3 was the Young's modulus ratio selected to provide a small hollow area while preventing delamination.

The ability to tune the twining angle was also investigated using different pneumatic pressure to precisely control the way that the soft robotic spiral gripper 200 can hold onto the target object. With the azimuthal angle of the helical pneumatic channel at 450° and pneumatic pressure varying between 0.1 to 0.675 MPa, which is the safe actuation range of the soft robotic spiral gripper 200 before breakage occurs, the resultant twining angle and pressure limit were simulated and shown in FIG. 2G and the table of FIG. 2F under different Young's modulus ratios, respectively.

Figures 2F, 2G:
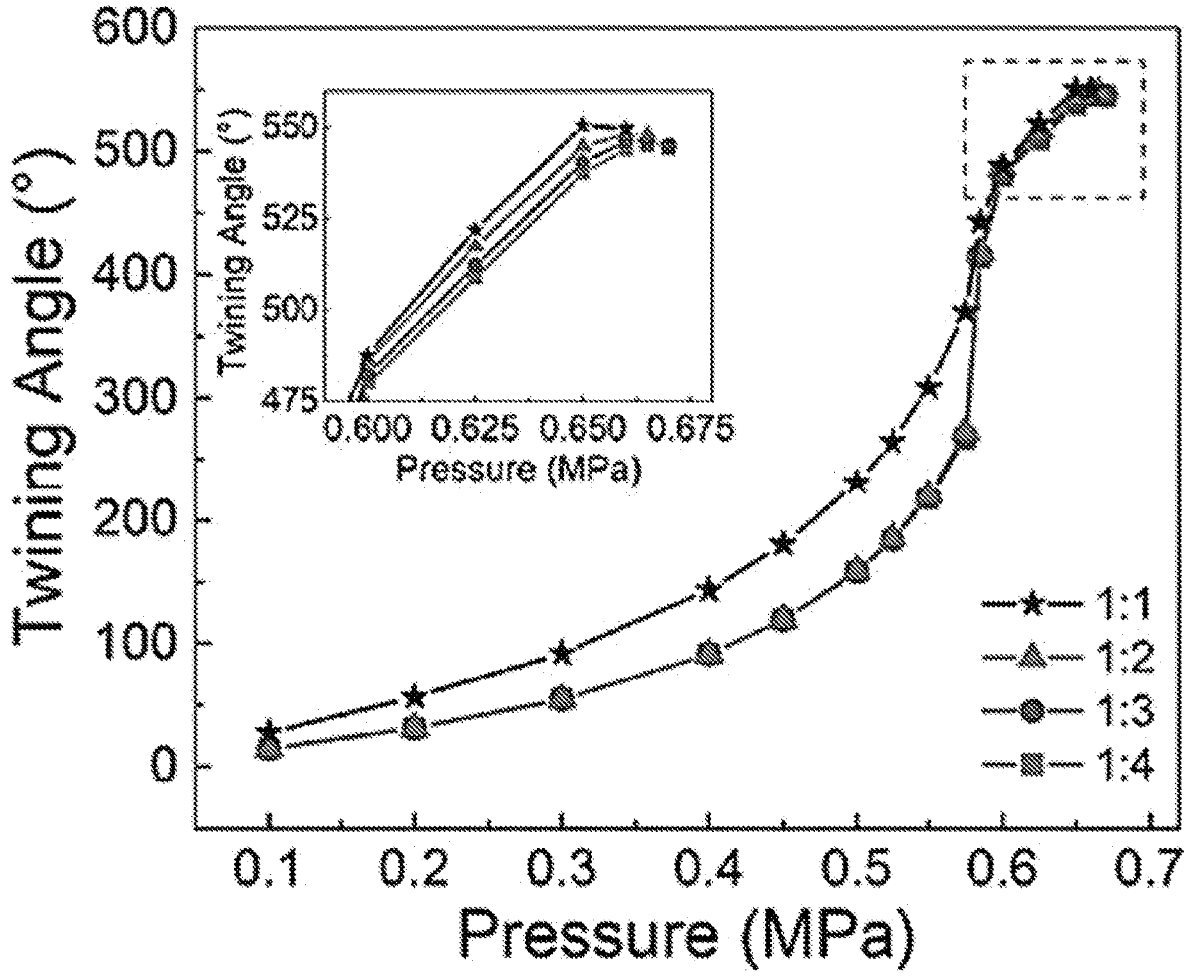

As shown in FIG. 2G, the resultant twining angle increases with the rising pneumatic pressure being applied. While the twining angle is similar for soft robotic spiral grippers 200 with Young's modulus ratios of 1:2, 1:3, and 1:4, the curve for the 1:1 Young's modulus ratio shows a larger twining angle can be obtained at a lower pressure setting because the material is so soft that twining can easily be achieved even in low pressure. In all cases, the twining angle increases significantly as the pressure approaches 0.55 MPa, and then gradually reaches their maximum allowable pressure before bursting. The insert in FIG. 2G is the enlarged region of the end stage, showing that the maximum allowable pressure is similar for all the cases. The maximum allowable pneumatic pressure and the resultant maximum twining angle are summarized in the table of FIG. 2F.

Experimental Design and Fabrication

Based on the simulation results above, the design parameters were determined as shown in FIGS. 2A and 2B. The 3D printed molds (FIG. 2C) were used to fabricate the soft spiral gripper 200. The soft spiral gripper body was made of a mix of Ecoflex 00-10 and Ecoflex 00-30 with a 1:1 mass ratio, with 100% modulus of 9 psi, while the elastic spine 206 was made of Dragon Skin 10, with 100% modulus of 27 psi, such that a material hardness ratio corresponding to Young's Modulus ratio of 1:3 was achieved. A 90-mm long high-birefringence optical fiber with birefringence of $6.33\times10^{-4}$ was embedded into the elastic spine 206 that was fabricated by filling a 3-mm diameter cylindrical mold with Dragon skin 10. Once the elastic spine 206 was cured, it was inserted to the center of the pneumatic channel mold (spiral shape rod 221). The mixture of Ecoflex 00-10 and 00-30 was used to fill the soft spiral gripper body mold. The soft robotic spiral gripper 200 was ready to be de-molded and tested once it was cured at room temperature for 3 hours.

The HB fiber optic sensor 203 can first be embedded in the elastic spine 206 made from, a harder silicone (e.g., Dragon Skin™ 10, Dragon Skin™ 20, Ecoflex™ 50) compares with the soft material used in the rest of the gripper 215 or other appropriate flexible material. The 100% modulus (that describes the elongation ability and shore hardness of the material) of the material used for the elastic spine 206 should be about three times or more of the 100% modulus of the soft robotic spiral gripper 200. The elastic spine not only minimize elongation at the center of the soft robotic spiral gripper 200 to prevent delamination at the fiber optic sensor 203, it can also strengthen the center of the soft robotic spiral gripper 200 to ensure that it will vertically spiral, mimicking the slow growing side of the twining plant. The elastic spine 206 can then be inserted through the middle of the spiral shape rod 221, and the gripper mold can then be filled with a softer silicone mixture 215 (e.g., Ecoflex™ 00-10 and 00-30 with a 1:2 ratio, polydimethylsiloxane (PDMS), Sylgard™) to form the soft robotic spiral gripper 200. The soft robotic spiral gripper 200 is ready once the silicone mixture 215 is cured and the 3D printed molds are removed. In some implementations, an out layer of material 218 can be applied to part of or the whole outer surface of the cured silicone mixture 215.

A standard Sagnac loop can be used to identify the birefringence change in the HB fiber optic sensor 203 resulting from twining through interference, wavelength shift, and power measurement. The amount of wavelength shift can provide an indication of the twining angle, target cylinder diameter, as well as identify the target property and external perturbation. A broadband light source and an optical spectrum analyzer with resolution of 0.08 pm was used during experimental testing of a fabricated soft robotic spiral gripper 200 to monitor the interference optical spectrum, while a laser source at 1545.363 nm (e.g., aligned at the transmission peak or notch of the interference spectrum) and an optical power meter controlled by LabView were used for real-time monitoring of the soft robotic spiral gripper 200.

FIGS. 3A and 3B are images of a fabricated soft robotic spiral gripper 200 before actuation and after actuation resulting in twining around a flower stem. During the testing, the fabricated soft robotic spiral gripper 200 was powered by air, which was steadily actuated (or inflated) and deactuated (or deflated) through the control of a pump, a vacuum, and a valve. When the pneumatic system is operated in a pumping state, air goes into the air channel 212 of the soft robotic spiral gripper 200 from the top and the inflation begins at one end (e.g., at the top) and gradually propagates along the length to finish at the other end, resulting in a spiral movement in the soft robotic spiral gripper 200 that mimics the growth movement of twining plants as discussed.

As the soft robotic spiral gripper 200 is twining (e.g., around a target), the HB fiber optic sensor 203 is being twisted, resulting in a decrease in the birefringence. Therefore, the free spectral range AA of the interference spectrum formed at the Sagnac loop changes according to $\Delta\lambda=\lambda^2/BL$, where B and L are the birefringence and length of the HB fiber. When looking at a small wavelength range (e.g., within 30 nm of the spectrum), a wavelength shift of the destructive interference notch can be observed as a result of a birefringence change.

Referring to FIG. 3C, shown is the experimental setup used for testing of the embedded fiber optic sensor 203 in the soft robotic spiral gripper 200. In the experiment, a high-birefringence bow-tie fiber (e.g., F-HB 1500, Newport, USA) was used as the embedded sensor. The Sagnac loop was formed outside of the soft robotic spiral gripper 200 to convert the detected twining angle into amplitude and wavelength shift information for measurement, as shown in FIG. 3C. A broadband light source and an optical spectrum analyzer (OSA) (e.g., AP2040A, APEX Technologies) were used to observe the spectral characteristic of the Sagnac loop. A 90-mm long high-birefringence optical fiber with 1-m single mode fiber (SMF) and a polarization controller (PC) were connected at the right side of the optical coupler to form the Sagnac loop. When the soft spiral gripper was actuated by the pneumatic control system, the embedded HB fiber was twisted and the birefringence of the fiber was varied slightly. The Sagnac loop converted the phase difference between the two counter propagating light into amplitude information via interference, resulting in a periodic cosine function across wavelength—referring to the optical comb. Therefore, the change in birefringence results in a change in the comb spacing ($\Delta\lambda=\lambda^2/BL$) of the optical interference spectrum, where A is the wavelength range of the broadband light source. Since the change in comb spacing is small, a shift in the comb position can be observed instead when the wavelength range of interest is small.

Experimental Results

Figure 4A:
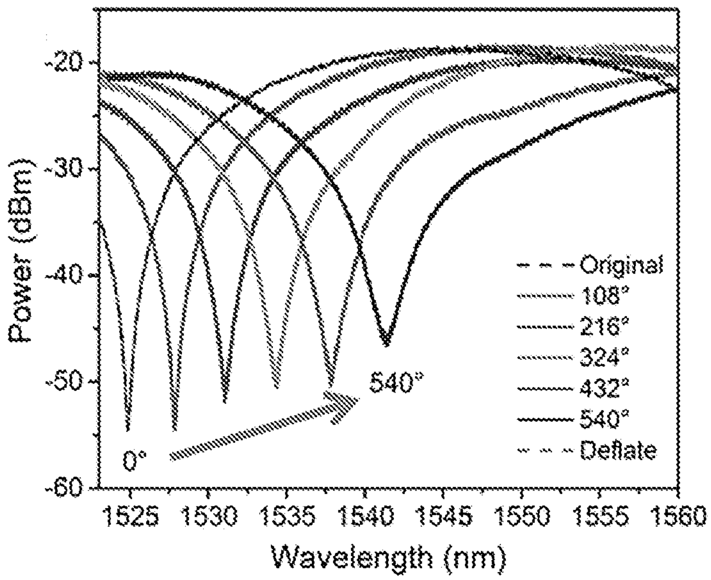
FIGS. 4A and 4B illustrate examples of the interference optical spectra and twining angle relationships of a fabricated soft robotic spiral gripper, in accordance with various embodiments of the present disclosure.

The transmission notch of the comb was used as the reference to measure the amount of comb shift during twining. FIG. 4A shows an example of the measured interference optical spectra of the embedded high-birefringence fiber sensor for various twining angles in the soft robotic spiral gripper 200. A 16.66 nm shift to the longer wavelength in the transmission notch was observed as the spiral gripper is actuated and gone through twining angle from 0 to 540°. The optical spectrum returns to its initial position when the soft robotic spiral gripper 200 is completely deflated, proving that there is no delamination between the HB fiber optic sensor 203 and the elastic spine 206 in the soft robotic spiral gripper 200. The prevention of delamination enables accurate and repeatable monitoring of the soft robotic spiral gripper 200 status.

Figure 4B:
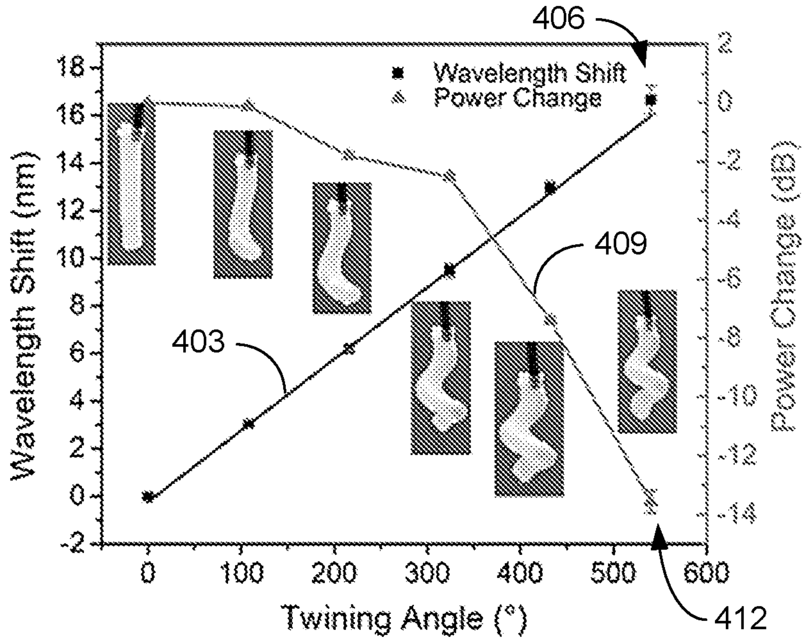

FIG. 4B illustrates an example of the relationship between twining angle and wavelength shift and power change of the sensor embedded in the soft robotic spiral gripper 200. The plot 403 of the relationship between the twining angle and the wavelength shift shows a linear relationship with a sensitivity of 0.03 nm/°. A small error bar 406 was observed, which proves that the HB fiber optic sensor embedded spiral gripper has very high repeatability. To enable real-time monitoring of the soft robotic spiral gripper 200, optical power measurement can be used instead. An 8-dBm laser source at 1545.363 nm that is spectrally aligned with the transmission peak of the interference spectrum at the original state (0° twining angle), was used with a LabView controlled optical power meter. As the soft spiral gripper is actuated, twining motion is observed and the transmission spectrum of the Sagnac loop shifts to the longer wavelength, resulting in a decrease in optical power at the laser wavelength. By monitoring the power change as the soft robotic spiral gripper 200 is twining from 0 to 540°, a plot 409 showing the relationship between power change and twining angle was determined as presented in FIG. 4B. It is shown that the optical power reduces as the twining angle increases and the power changing pattern follows closely to the Sagnac loop transmission spectrum. A small error bar 412 was observed which again proves that no delamination occurs and a highly repeatable soft robotic spiral gripper 200 was achieved.

Figure 5A:
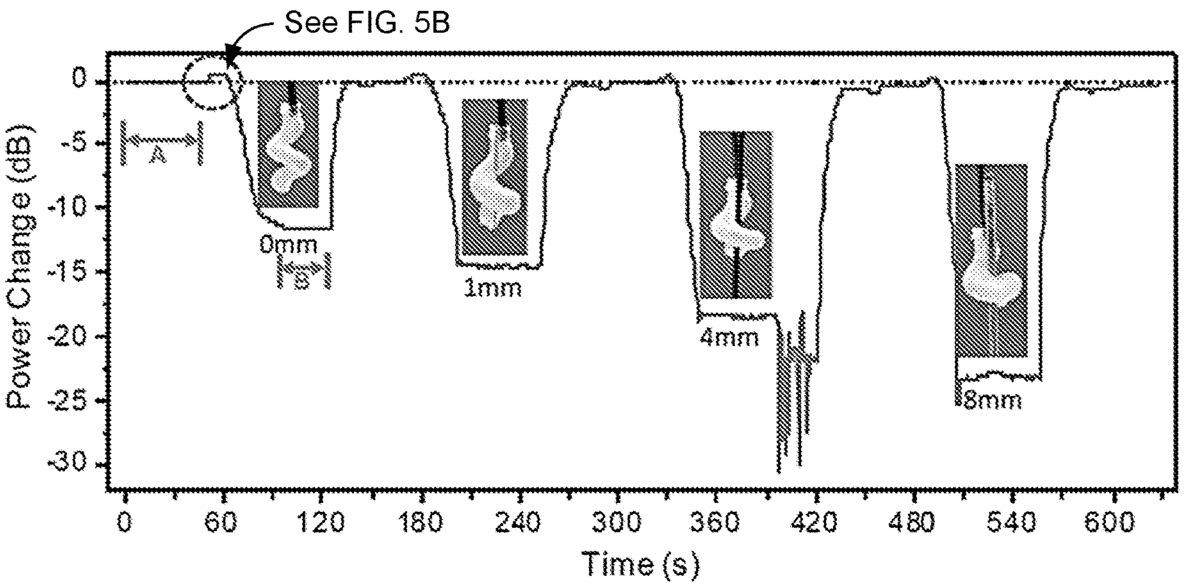
FIGS. 5A and 5B illustrate an example of real-time monitoring of the fabricated soft robotic spiral gripper using optical power measurement, in accordance with various embodiments of the present disclosure.
Figure 5B:
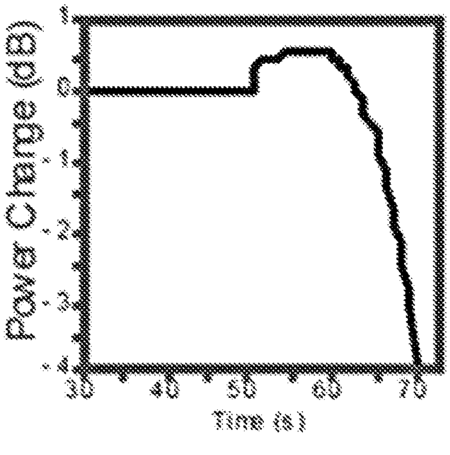

Next, the ability of the soft robotic spiral gripper 200 to hold a target object with various diameters, and the ability for the high-birefringence fiber optic sensor to detect the twining process and identify the size of the target object, were studied. The advantages of a soft robotic spiral gripper 200 include its ability to hold small objects and to operate in a confined area by approaching the target from the top (or bottom) and gripping the object with a spiral motion. FIGS. 5A and 5B illustrate an example of the power change at a particular wavelength of the interference spectrum of the embedded HB fiber 203 in the soft robotic spiral gripper 200 as it performs various gripping tasks and experiencing external perturbations.

In FIG. 5A, the soft robotic spiral gripper 200 is first in the original deflated state (region A), then the pneumatic system is activated to actuate the soft robotic spiral gripper 200. The onset of actuation is indicated by the small peak in the dashed circle. FIG. 5B is an expanded view of the region in the dashed circle. The whole actuation process takes about 35 seconds, and the soft robotic spiral gripper 200 is completely entwined without gripping a target object (region B). A power change of −11.48 dB was observed. The soft robotic spiral gripper 200 was then deactuated (deflated) by enabling a vacuum in the pneumatic system and the power change returns to zero.

Next, the soft robotic spiral gripper 200 was used to hold a small object (a 1-mm paper clip wire). As the pneumatic soft robotic spiral gripper 200 was actuated, the optical power dropped and resulted in a −14.59-dB power change compare with its resting state. Although the paper clip was only 1-mm in diameter, the soft robotic spiral gripper 200 can hold on the paper clip securely and the HB fiber optic sensor 203 is sensitive enough to tell the presence of the 1-mm paper clip. An additional power drop of 3.11 dB was observed with the presence of the 1-mm paper clip.

Then, the soft robotic spiral gripper 200 was deactuated (deflated) again and actuated to hold a 4-mm paint brush. An additional power drop of 7.02 dB was observed with the presence of the 4-mm paint brush. External force was applied in an attempt to pull away the paint brush. The HB fiber optic sensor 203 picked up the event and showed high frequency fluctuation in the optical power, proving that the sensor is capable of identifying an external perturbation to the target object. The soft robotic spiral gripper 200 had strong anchorage points on the target object preventing the removal the object from the grip.

Lastly, an 8-mm pencil was used as the target object. The spiral gripper can hold the pencil firmly, resulting in an additional power drop of 4.68 dB with the presence of the 8-mm pencil. The soft robotic spiral gripper 200 exhibited excellent repeatability and the power always returned to the original state as shown by the dashed line in FIG. 5A.

A pneumatic soft robotic spiral gripper embedded with a high-birefringence (HB) fiber optic sensor was designed and demonstrated. The elastic spine and the single spiral pneumatic (air) channel enable the soft robotic spiral gripper to operate in a confined area and to firmly hold onto objects with diameters as small as 1 mm, as well as preventing delamination to occur for high-repeatability performance. The embedded fiber optic sensor has a twining angle sensitivity of 0.03 nm/° and facilitates the sensing of the twining angle, the target cylinder diameter (or radius), as well as identifying the target property and external perturbation.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A pneumatic soft robotic spiral gripper, comprising:
- an elastic spine comprising an embedded fiber optic sensor; and
- a single pneumatic spiral channel twining around and adiacent to the elastic spine, the single pneumatic spiral channel formed in a soft gripping material surrounding the elastic spine.

2. The pneumatic soft robotic spiral gripper of claim 1, wherein the embedded fiber optic sensor is a high-birefringence (HB) fiber optic sensor.

3. The pneumatic soft robotic spiral gripper of claim 1, wherein the embedded fiber optic sensor is centered in the elastic spine, extending along an axial length of the elastic spine.

4. The pneumatic soft robotic spiral gripper of claim 1, wherein the elastic spine comprises a cured silicone surrounding the embedded fiber optic sensor.

5. The pneumatic soft robotic spiral gripper of claim 4, wherein the cured silicone has a shore hardness of about 10 A or higher.

6. The pneumatic soft robotic spiral gripper of claim 5, wherein the soft gripping material has a shore hardness that is ⅓ of the shore hardness of the cured silicone used in the elastic spine.

7. The pneumatic soft robotic spiral gripper of claim 1, wherein the elastic spine has a first diameter and the single pneumatic spiral channel has a second diameter less than or equal to the first diameter.

8. The pneumatic soft robotic spiral gripper of claim 1, wherein the pneumatic soft robotic spiral gripper twines in an encircling motion in response to actuation of the single pneumatic spiral channel with a gas or fluid.

9. The pneumatic soft robotic spiral gripper of claim 8, wherein the gas is air.

10. The pneumatic soft robotic spiral gripper of claim 1, wherein the single pneumatic spiral channel is formed with at least one complete spiral cycle around the elastic spine.

11. The pneumatic soft robotic spiral gripper of claim 10, wherein the single pneumatic spiral channel is formed with an integer number of spiral cycles around the elastic spine.

12. The pneumatic soft robotic spiral gripper of claim 10, wherein the single pneumatic spiral channel is formed with a fractional number of spiral cycles around the elastic spine.

13. A method for fabrication of a pneumatic soft robotic spiral gripper, comprising:
- providing a gripper mold comprising:
  - an outer mold wall extending along a length of the gripper mold from a proximal end to a distal end; and
  - a spiral shaped rod positioned within the outer mold wall, the spiral shape rod extending from the proximal end of the gripper mold to adjacent to the distal end of the gripper mold, where a length of the spiral shaped rod is less than the length of the gripper mold;
- inserting an elastic spine through the spiral shaped rod, the elastic spine extending from adjacent to the proximal end of the gripper mold to adjacent to the distal end of the gripper mold;
- filling the gripper mold with a gripping material that surrounds the elastic spine and spiral shaped rod;
- curing the gripping material in the gripper mold to form a soft gripping material surrounding the elastic spine; and
- removing the soft gripping material and elastic spine from the gripper mold, the soft gripping material comprising a pneumatic spiral channel surrounding the elastic spine, the pneumatic spiral channel formed by the spiral shaped rod.

14. The method of claim 13, wherein the elastic spine comprises an embedded fiber optic sensor.

15. The method of claim 13, wherein the gripper mold is a three-dimensional printed mold.

16. The method of claim 15, wherein the pneumatic spiral channel is formed by the spiral shaped rod with at least one complete spiral cycle around the elastic spine.

* * * * *